United States Patent [19]

Sugihara et al.

[11] Patent Number: 4,716,733
[45] Date of Patent: Jan. 5, 1988

[54] CLUTCH MASTER CYLINDER

[75] Inventors: Masami Sugihara; Osamu Ogura, both of Kariya; Hajime Arai; Satoru Maruyamano, both of Toyota, all of Japan

[73] Assignees: Aisin Seiki Kabushiki Kaisha, Kariya; Toyota Jidosha Kabushiki Kaisha, Toyota, both of Japan

[21] Appl. No.: 759,313

[22] Filed: Jul. 26, 1985

[30] Foreign Application Priority Data

Jul. 27, 1984 [JP] Japan .................. 59-115411[U]

[51] Int. Cl.⁴ ............................................. B60T 11/28
[52] U.S. Cl. ......................................... 60/589; 251/363
[58] Field of Search ............... 60/585, 588, 589, 533, 60/562, 592; 251/359, 363, 360; 411/55

[56] References Cited

U.S. PATENT DOCUMENTS

| | | | |
|---|---|---|---|
| 2,583,291 | 1/1952 | Beem | 251/360 |
| 3,107,082 | 10/1963 | Reynolds | 251/363 |
| 3,505,815 | 4/1970 | Wherry | 60/589 |
| 3,688,501 | 9/1972 | Ellis, Jr. | 60/589 |
| 4,419,862 | 12/1983 | Farr | 60/589 |
| 4,516,400 | 5/1985 | Tarplee | 60/589 |
| 4,553,395 | 11/1985 | Price | 60/589 |

FOREIGN PATENT DOCUMENTS 1553933 12/1967 France .
1054202 1/1967 United Kingdom .
1107252 3/1968 United Kingdom .

*Primary Examiner*—Abraham Hershkovitz
*Attorney, Agent, or Firm*—Oblon, Fisher, Spivak, McClelland, & Maier

[57] ABSTRACT

A clutch master cylinder comprises a master cylinder body provided thereon with a fluid reservoir tank and therein with an inlet port in communication with the reservoir tank and an outlet port for connection to a slave cylinder, a piston axially slidably disposed within the cylinder body and arranged to be moved inward by a push-rod, a valve seat arranged between the inlet and outlet ports within the cylinder body to permit fluid flow passing therethrough, a valve body associated with the piston to cooperate with the valve seat in response to inward movement of the piston, a fixed plug mounted on the cylinder body, and an adjusting plug disposed within the cylinder body to adjust an axial space between the valve seat and the valve body, the adjusting plug having an outer end portion adjustably threaded into the fixed plug and fastened in place by a lock nut threaded thereon and being provided at an intermediate portion thereof with an annular flange engageable with the inner end of the fixed plug to restrict outward movement of the adjusting plug.

6 Claims, 6 Drawing Figures

![4,716,733]

CLUTCH MASTER CYLINDER

BACKGROUND OF THE INVENTION

1. Field of the Invention

The present invention relates to a clutch master cylinder for use in a clutch release mechanism, and more particularly to a clutch master cylinder of the variable valve lift type which includes a valve seat arranged between inlet and outlet ports, and a valve body associated with a piston to cooperate with the valve seat in response to axial movement of the piston so as to interrupt the communication between the inlet and outlet ports.

2. Description of the Prior Art

As is illustrated in FIG. 6, a conventional clutch master cylinder of this kind comprises a cylinder body 2 provided thereon with a fluid reservoir tank T and therein with an inlet port $2a_1$ in communication with the reservoir tank T and an outlet port $2a_2$ for connection to a slave cylinder in a clutch release mechanism, a closure plug 1 adjustably threaded into one end of the cylinder body 2 and fastened in place by a lock nut 3, the closure plug 1 being formed at the inner end thereof with an annular valve seat 1a arranged between the inlet and outlet ports $2a_1$ and $2a_2$, a piston 4 axially slidably disposed within the cylinder body 2 and arranged to be moved by a push-rod in depression of a clutch pedal, and a valve body 5 associated with the piston 4 to cooperate with the valve seat 1a in response to axial movement of the piston 4 so as to interrupt the communication between the inlet and outlet ports $2a_1$ and $2a_2$.

In such a construction of the conventional clutch master cylinder as described above, it is advantageous that the axial space between the valve seat 1a and the valve body 5 (hereinafter referred to a lift amount of the valve body 5) can be adjusted by back and forth adjustment of the closure plug 1. This enables adjustable operation of the clutch release mechanism in accordance with defacement of the clutch disc so as to ensure the operator's feel in depression of the clutch pedal. It has been, however, experienced that when the lock nut 3 is loosened to permit outward movement of the closure plug 1 for adjustment of the lift amount of the valve body 5, the closure plug 1 is excessively retracted from the cylinder body 2 because of no provision of any stopper for restricting outward movement of the closure plug. As a result, the lift amount of the valve body 5 is in excess an allowable amount, and annular seal members 6 and 7 for the closure plug 1 are damaged by abutment against a threaded portion 2c and an annular groove 2b formed in the cylinder body 2. If the closure plug 1 is excessively threaded into the cylinder body 2, the lift amount of the valve body 5 will be determined less than the allowable amount, and the threaded portion 1b of closure plug 1 will be engaged with an unthreaded portion 2d in the cylinder body 2 so as to cause stick and wear of the closure plug 1 at its intermediate portion. If the valve seat 1a is abutted against the valve body 5 in adjustment of the closure plug 1, a fluid under pressure will be shut up in the pressure chamber of cylinder body 2.

SUMMARY OF THE INVENTION

It is, therefore, a primary object of the present invention to provide an improved clutch master cylinder wherein back and forth adjustment of the closure plug is restricted to determine the lift amount of the valve body only to an allowable extent without causing any problems described above.

According to the present invention there is provided a clutch master cylinder which comprises a master cylinder body provided thereon with a fluid reservoir tank therein with an inlet port in communication with the reservoir tank and an outlet port for connection to a slave cylinder in a clutch release mechanism, a piston axially slidably disposed within the cylinder body and arranged to be moved inward by a push-rod, a valve seat arranged between the inlet and outlet ports within the cylinder body to permit fluid flow passing therethrough, a valve body associated with the piston to cooperate with the valve seat in response to inward movement of the piston so as to interrupt the communication between the inlet and outlet ports, and an adjusting plug disposed within the cylinder body to adjust an axial space between the valve seat and the valve body and being fastened in its adjusted position to maintain the axial space in an adjusted amount, and wherein a fixed plug is mounted on the cylinder body to support an outer end portion of the adjusting plug, and the outer end portion of the adjusting plug is adjustably threaded into the fixed plug and fastened in place by a lock nut threaded thereon, the adjusting plug being provided at an intermediate portion thereof with an annular flange engageable with the inner end of the fixed plug to restrict outward movement of the adjusting plug.

In a preferred embodiment of the present invention, the fixed plug is fixedly threaded into one end of the cylinder body, the adjusting plug is in the form of a closure plug adjustably threaded into the fixed plug at the outer end portion thereof and arranged coaxial with the piston, and the valve seat is formed on the inner end of the closure plug to cooperate with the valve body.

BRIEF DESCRIPTION OF THE DRAWINGS

Additional objects, features and advantages of the present invention will become readily apparent from the following detailed description of preferred embodiments thereof when considered with reference to the accompanying drawings, in which.

DESCRIPTION OF THE PREFERRED EMBODIMENTS

Figure 1:
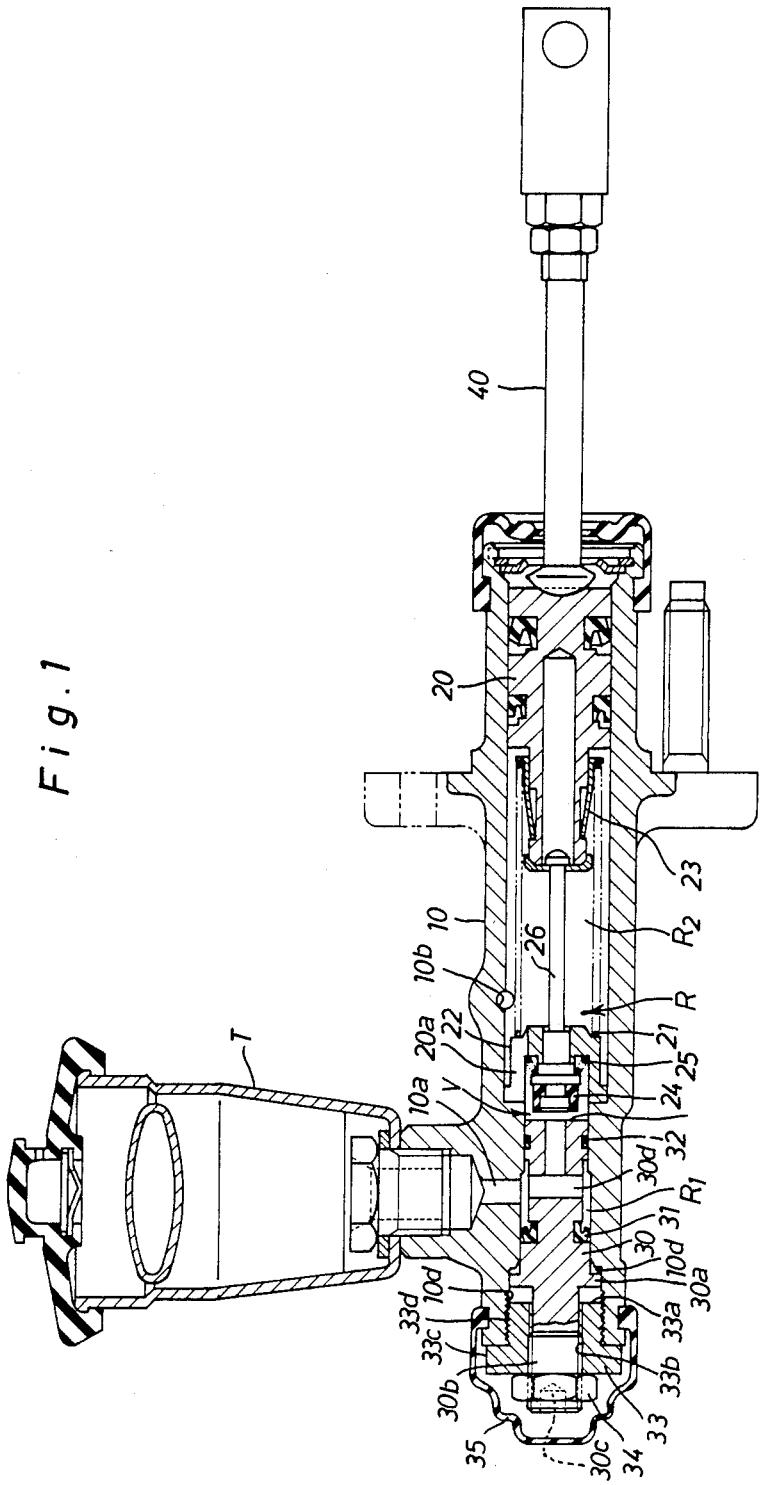
FIG. 1 is a sectional view of a preferred embodiment of a clutch master cyinder in accordance with the present invention.

Referring now to the drawings, FIG. 1 illustrates a clutch master cylinder in accordance with the present invention which is arranged for use in a clutch release mechanism. The clutch master cylinder comprises a master cylinder body 10 provided thereon with a fluid reservoir tank T and therein with an inlet port 10a in communication with the reservoir tank T and an outlet port 10b for connection to a slave cylinder (not shown)

in the clutch release mechanism. In the clutch master cylinder, a piston 20 is axially slidably disposed in a fluid-tight manner within the right end portion of master cylinder body 10 to form a fluid chamber R in communication with the inlet and outlet ports 10a and 10b, and a closure plug 30 is disposed within the left end portion of master cylinder body 10 to be adjustable in a direction coaxial with the piston 20. The piston 20 is arranged to be moved leftward by a push-rod 40 in depression of a clutch pedal (not shown) and is biased rightward by a compression coil spring 21. The compression coil spring 21 is engaged at one end thereof with a holder 22 and at the other end thereof with a retainer member 23 coupled over the inner end of piston 20 such that the holder 22 is fixed in place by engagement with an annular stepped shoulder in cylinder body 10.

A connecting rod 26 is slidably supported at the opposite ends thereof by means of the holder 22 and the retainer member 23. In this arrangement, the connecting rod 26 is axially movable in a counter bore in piston 20 and is biased leftward by means of a compression coil spring 25 the biasing force of which is smaller than that of the compression coil spring 21. Thus, the connecting rod 26 is engaged at the right end thereof with the retainer member 23 under the biasing force of spring 25, as shown in the figure. An annular valve body 24 is secured to the left end of connecting rod 26 to provide a cut-off valve V cooperable with an annular valve seat 30e formed on the inner end of closure plug 30. When the piston 20 is in an inoperative position as shown in the figure, the valve body 24 is spaced from the valve seat 30e to permit fluid flow between the inlet and outlet ports 10a and 10b. When the piston 20 is moved by actuation of the push-rod 40 leftward in a predetermined distance against the biasing force of spring 21, the valve body 24 engages the valve seat 30e under the biasing force of spring 25 to subdivide the fluid chamber R into a reservoir chamber $R_1$ in communication with the inlet port 10a and a pressure chamber $R_2$ in communication with the outlet port 10b.

The closure plug 30 is slidably engaged within the cylinder body 10 through a pair of axially spaced annular seal members 31 and 32 and is adjustably supported at its outer end portion by means of an annular support member 33 in the form of a fixed plug fixedly threaded into the left end of cylinder body 10. The closure plug 30 is fastened in place by a lock nut 34 threaded on the outer end thereof. The closure plug 30 is integrally formed at an intermediate portion thereof with an annular flange 30a which is arranged to be engageable with the inner end 33a of fixed plug 33 and with an annular stepped shoulder 10c in cylinder body 10. The closure plug 30 is further formed therein with a fluid passage 30d for communication between the inlet port 10a and the valve seat 30e and formed at its outer end with a hexagon socket 30c. Furthermore, the outer end portion of closure plug 30 is formed with an external thread 30b in engagement with an internal thread 33b formed in the fixed plug 33. The fixed plug 33 is formed with a hexagon head 33c and an external thread 33d in engagement with an internal thread 10d formed in the left end portion of cylinder body 10. In addition, the fixed plug 33 and the lock nut 34 are contained within a boot 35 fixedly coupled over the left end portion of cylinder body 10.

In the above-described clutch master cylinder, a lift amount of the valve body 24 defined by the axial space between the valve seat 30e and the valve body 24 can be adjusted by back and forth adjustment of the closure plug 30 to ensure the operator's feel in depression of the clutch pedal. During adjustment of the closure plug 30, the annular flange 30a of plug 30 will be engaged with the inner end 33a of fixed plug 33 to restrict an excessive outward movement of the closure plug 30 and will be engaged with the annular stepped shoulder 10c in cylinder body 10 to restrict an excessive inward movement of the closure plug 30. Thus, the lift amount of the valve body 24 can be adjusted only in an allowable extent without causing any damage of the annular seal members 31 and 32. Additionally, the adjustment of the closure plug 30 can be carried out by a relatively small operation torque, since the external thread portion 30b of plug 30 is small in diameter.

Figure 3:
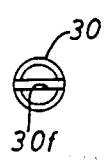
FIG. 3 illustrates the left end of a closure plug shown in FIG. 2.
Figure 2:
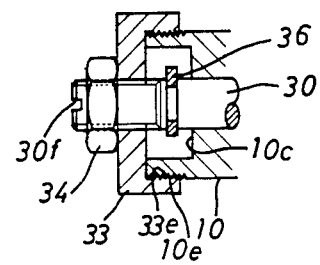
FIG. 2 illustrates a modification of the embodiment shown in FIG. 1.
Figure 4:
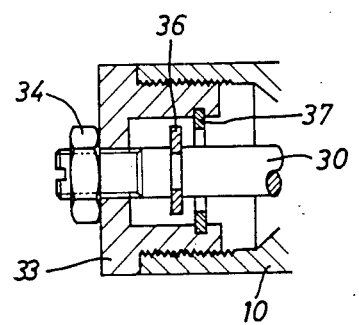
FIG. 4 illustrates another modification of the embodiment shown in FIG. 1.

In the actual practice of the present invention, the clutch master cylinder may be modified as is illustrated in FIGS. 2 and 3, wherein the annular flange 30a of closure plug 30 is replaced with an annular clip 36 fixed to an intermediate portion of the closure plug 30, and wherein the hexagon socket 30c of closure plug 30 is replaced with a radial slot 30f. In this modification, the fixed plug 33 is coupled over the left end of cylinder body 10 and fastened in place by engagement of its internal thread 33e with an external thread 10e on the cylinder body 10. In FIG. 4, there is illustrated another modification of the clutch master cylinder, wherein the annular clip 36 of closure plug 30 is arranged to be engageable with an annular clip 37 fixed to the inner wall of fixed plug 33. The other construction of the modifications is substantially the same as that of the clutch master cylinder shown in FIG. 1.

Figure 5:
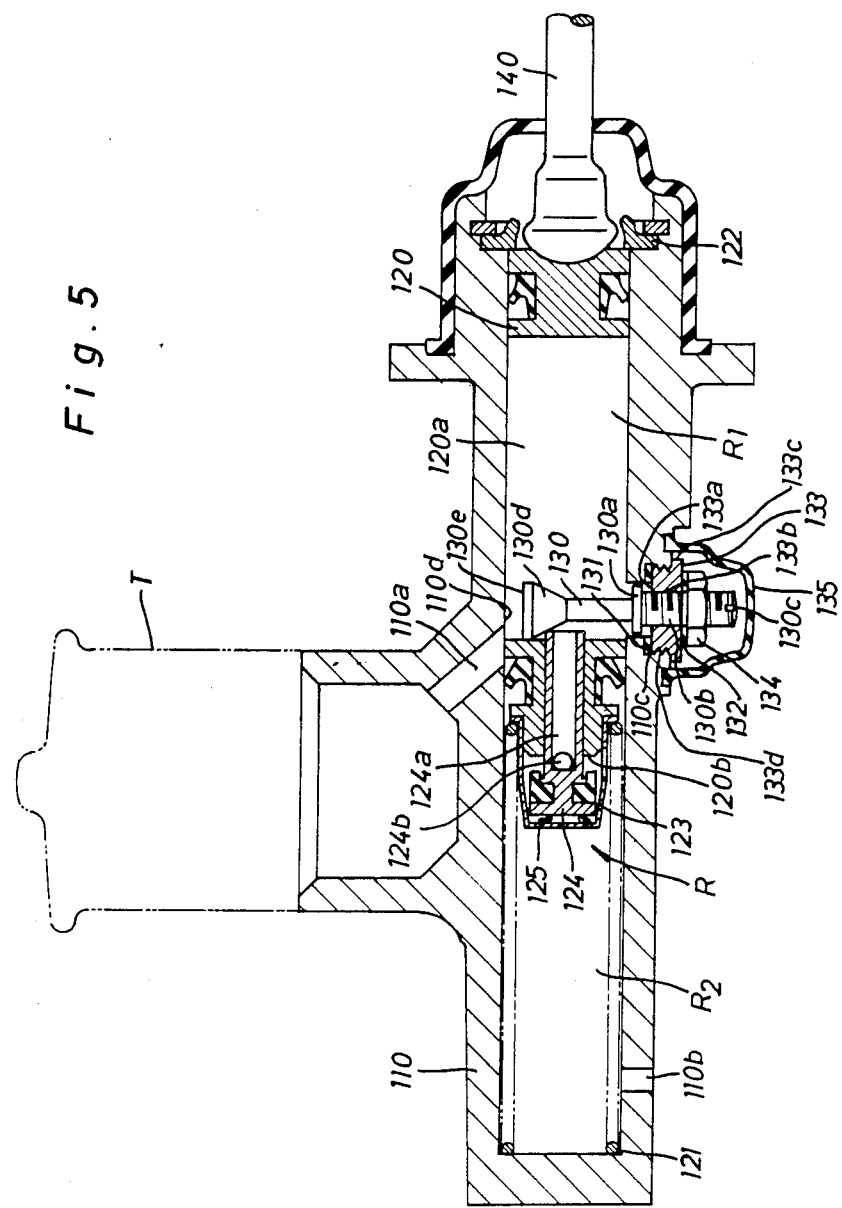
FIG. 5 is a sectional view of another embodiment of a clutch master cylinder in accordance with the present invention.
Figure 6:
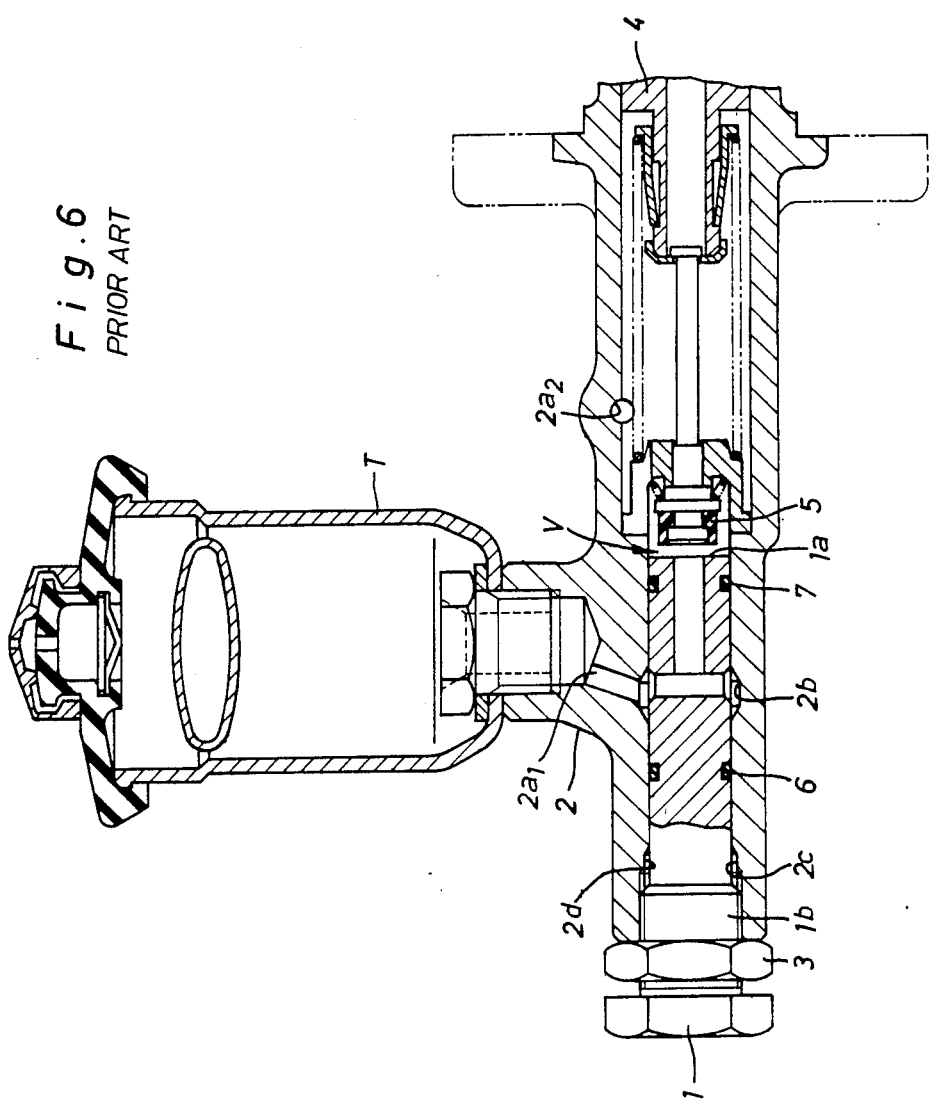
FIG. 6 is a sectional view of a conventional clutch master cylinder.

In FIG. 5, there is illustrated another embodiment of a clutch master cylinder in accordance with the present invention, wherein a piston 120 is axially slidably disposed in a fluid-tight manner within a master cylinder body 110, and an adjusting plug 130 is assembled with an intermediate portion of the master cylinder body 110 to be adjustable in a radial direction. The master cylinder body 110 is provided thereon with a fluid reservoir tank T and therein with an inlet port 110a in communication with the reservoir tank T and an outlet port 110b for connection to a slave cylinder in a clutch release mechanism. In this embodiment, the piston 120 is formed at the intermediate portion thereof with an elongated axial slot 120a which is arranged to contain the adjusting plug 130 therein. The piston 120 is arranged to be moved leftward by a push-rod 140 in depression of a clutch pedal (not shown) and is biased rightward by a compression coil spring 121. The right end of piston 120 is received by an annular stopper 122 fixed to the right end of cylinder body 110. The compression coil spring 121 is engaged at one end thereof with an inner end wall of cylinder body 110 and at the other end thereof with a retainer member 123 coupled over the inner end portion of piston 120.

In such an arrangement of the piston 120, a valve body element 124 is axially slidably disposed within the inner end portion of piston 120 and is biased rightward by a compression coil spring 125 the biasing force of which is smaller than that of the compression coil spring 121. The valve body element 124 has a tubular portion which is formed with an axial passage 124a and a radial hole 124b. When the piston 120 is in an inoperative position, the valve body element 124 is engaged at its right end with a conical inner end 130d of adjusting plug 130 under the biasing force of spring 125. Thus, the valve body element 124 is spaced from an annular valve seat 120b formed on the inner end of piston 120 to permit fluid flow passing therethrough. When the piston 120 is moved by actuation of the push-rod 140 leftward in a predetermined distance against the biasing force of spring 121, the valve body element 124 engages the valve seat 120b under the biasing force of spring 125 to subdivide a fluid chamber R in cylinder body 110 into a reservoir chamber $R_1$ in communication with the inlet port 110a and a pressure chamber $R_2$ in communication with the outlet port 110b.

The adjusting plug 130 is adjustably supported at its outer end portion by means of an annular support member 133 in the form of a fixed plug fixedly threaded into the intermediate portion of cylinder body 110 through an annular seal member 131. The adjusting plug 130 is fastened in place by a lock nut 134 threaded on the outer end thereof through an annular seal member 132. The adjusting plug 130 is integrally formed at an intermediate portion thereof with an annular flange 130a which is arranged to be engageable with the inner end of fixed plug 133. In addition, the adjusting plug 130 is formed with an external thread 130b in engagement with an internal thread 133b of fixed plug 133 and formed at its outer end with a radial slot 130c. The fixed plug 133 is formed with a hexagon head 133c and an external thread 133d in engagement with an internal thread 110c formed in the intermadiate portion of cylinder body 110. The fixed plug 133 and the lock nut 134 are contained within a boot 135 fixedly coupled with the intermediate portion of cylinder body 110.

In the clutch master cylinder of FIG. 5, a lift amount of the valve body element 124 defined by the axial space between the valve seat 120b and the valve body element element 124 can be adjusted by back and forth adjustment of the adjusting plug 130 to ensure the operator's feel in depression of the clutch pedal. During adjustment of the adjusting plug 130, the annular flange 130a of plug 130 will be engaged with the inner end 133a of fixed plug 133 to restrict an excessive outward movement of the plug 130. The adjusting plug 130 will be engaged at its inner end face 130e with an inner wall 110d in cylinder body 110 to restrict an excessive inward movement of the plug 130. Thus, the lift amount of the valve body element 124 can be adjusted only in an allowable extent.

Having now fully set forth both structure and operation of preferred embodiments of the concept underlying the present invention, various other embodiments as well as certain variations and modifications of the embodiments herein shown and described, will obviously occur to those skilled in the art upon becoming familiar with said underlying concept. It is to be understood, therefore, that within the scope of the appended claims the invention may be practiced otherwise than as specifically set forth herein.

What is claimed is:

1. A clutch master cylinder for use in a clutch release mechanism, comprising:
    a master cylinder body provided thereon with a fluid reservoir tank and therein with an inlet port in communication with said reservoir tank and an outlet port for connection to a slave cylinder in said clutch release mechanism;
    a piston axially slidably disposed within said cylinder body and arranged to be moved inward by a push-rod;
    a valve seat arranged between said inlet and outlet ports within said cylinder body to permit fluid flow passing therethrough;
    a valve body associated with said piston to cooperate with said valve seat in response to inward movement of said piston so as to interrupt the communication between said inlet and outlet ports; and
    an adjusting plug disposed within said cylinder body to adjust an axial space between said valve seat and said valve body and being fastened in its adjusted position to maintain the axial space in an adjusted amount;
    wherein a fixed plug is mounted on said cylinder body to support an outer end portion of said adjusting plug, and wherein the outer end portion of said adjusting plug is adjustably threaded into said fixed plug and fastened in place by a lock nut threaded thereon, said adjusting plug being provided at an intermediate portion thereof with an annular flange engageable with the inner end of said fixed plug to restrict outward movement of said adjusting plug and engageable with an inner wall of said cylinder body to restrict inward movement of said adjusting plug.

2. A clutch master cylinder as claimed in claim 1, wherein said fixed plug is fixedly threaded into one end of said cylinder body, and said adjusting plug is in the form of a closure plug adjustably threaded into said fixed plug at the outer end portion thereof and arranged coaxial with said piston, and wherein said valve seat is formed on the inner end of said closure plug to cooperate with said valve body.

3. A clutch master cylinder as claimed in claim 2, wherein the annular flange of said adjusting plug is in the form of an annular flange integrally formed on an intermediate portion of said closure plug and arranged to be engageable with the inner end of said fixed plug and with an annular stepped shoulder in said cylinder body.

4. A clutch master cylinder as claimed in claim 1, wherein said fixed plug is fixedly coupled over one end of said cylinder body, and said adjusting plug is in the form of a closure plug adjustably threaded into said fixed plug at the outer end portion thereof and arranged coaxial with said piston, and wherein said valve seat is formed on the inner end of said closure plug to cooperate with said valve body, and the annular flange of said adjusting plug is in the form of an annular clip fixed to an intermediate portion of said closure plug and arranged to be engageable with the inner end of said fixed plug and with an annular stepped shoulder in said cylinder body.

5. A clutch master cylinder as claimed in claim 1, wherein said piston is formed at an intermediate portion thereof with an elongated axial slot, said fixed plug is threaded into an intermediate portion of said cylinder body in a radial direction and fixed in place, and said adjusting plug has an outer end portion adjustably threaded into said fixed plug and an inner end portion arranged in the elongated axial slot of said piston, and wherein said valve seat is an annular valve seat formed on the inner end of said piston, and said valve body is a valve body element axially slidably disposed within the inner end portion of said piston through said annular valve seat and being engaged at one end thereof with the inner end of said adjusting plug, said valve body element being arranged to cooperate with said annular valve seat in response to inward movement of said piston to interrupt the communication between said inlet and outlet ports.

6. A clutch master cylinder for use in a clutch release mechanism comprising:

- a master cylinder body provided thereon with a fluid reservoir tank and therein with an inlet port in communicaton with said reservoir tank and an outlet port for connection to a slave cylinder in said clutch release mechanism;
- a piston axially slidably disposed within said cylinder body and arranged to be moved inward by a pushrod;
- a valve seat arranged between said inlet and outlet ports within said cylinder body to permit fluid flow passing therethrough;
- a valve body associated with said piston to cooperate with said valve seat in response to inward movement of said piston so as to interrupt communication between said inlet and outlet ports; and
- an adjusting plug disposed within said cylinder body to adjust an axial space between said valve seat and said valve body and being fastened in its adjusted position to maintain the axial space in an adjusted amount;

wherein a fixed plug is mounted on said cylinder body to support an outer end portion of said adjusting plug, and wherein the outer end portion of said adjusting plug is adjustably threaded into said fixed plug and fastened in place by a lock nut threaded thereon, said adjusting plug having an intermediate portion provided with an annular clip fixed thereto, said annular clip being engageable with the inner end of said fixed plug to restrict outward movement of said adjusting plug and engageable with an annular clip fixed to the inner wall of said fixed plug in a position axially spaced from the inner end of said fixed plug to restrict inward movement of said adjusting plug.

* * * * *